Dec. 14, 1954

L. A. WENDEL 2,697,179

VENTILATION OF DYNAMOELECTRIC MACHINES

Filed March 11, 1952

Witness-
William Martin

Inventor
Lorenz A. Wendel
By William P. Stewart
Attorney

Dec. 14, 1954

L. A. WENDEL 2,697,179

VENTILATION OF DYNAMOELECTRIC MACHINES

Filed March 11, 1952

Witness:
William Martin

Inventor
Lorenz A. Wendel
By William P. Stewart
Attorney

United States Patent Office 2,697,179
Patented Dec. 14, 1954

2,697,179

VENTILATION OF DYNAMOELECTRIC MACHINES

Lorenz A. Wendel, Somerville, N. J., assignor to The Singer Manufacturing Company, Elizabeth, N. J., a corporation of New Jersey Application March 11, 1952, Serial No. 275,894

4 Claims. (Cl. 310—62)

This invention relates to ventilating means for cooling parts of a dynamoelectric machine and, more particularly, relates to ventilating means for cooling the driving-end bearing of an electric motor which is especially designed for driving fans which must operate inside of drying chambers, in which service the motors are subjected to relatively high temperatures and thus require special ventilation.

Motors of this general type are characterized by having flanges for mounting on the drying-chamber wall and having a motor-bearing support located well within the chamber. The shaft extends within the drying chamber and terminates in an impeller for circulating air within the chamber. Illustrative of motors of this type is the motor shown and described in the U. S. patent of H. S. Bogaty, No. 2,196,952, April 9, 1940 to which reference may be had for a more complete understanding of the problem involved.

It will be seen that, in the motor of the prior patent, a fan is located within the motor housing on the shaft between the motor rotor and the driving-end bearing. The end-cover at the driving end of the motor comprises an outer flanged bonnet and an inner annular shield which define circumferentially-spaced longitudinal intake ducts connected to the atmosphere through openings adjacent the flange. Air is drawn in through the intake openings and flows to the inner end of the bonnet where it reverses and flows through ducts between the annular shield and the bearing housing to be finally exhausted by the fan through radial ducts in the stator ring.

The difficulty with this arrangement as an effective means of cooling the bearing, lies in the fact that the entering air travels for some considerable distance through the intake ducts in good heat transfer relation with the dryer chamber itself and thus absorbs much heat therefrom even before it can begin its function of cooling the bearing. The result is that the cooling air in immediate contact with the bearing housing is considerably hotter than the ambient temperature and thus less able to reduce the bearing temperature.

In the present invention, this condition is improved by reversing the flow of air past the bearing housing by the relatively simple expedient of moving the fan to a position on the shaft on the opposite side of the bearing from the motor rotor and, what were formerly the intake ducts, now become, in effect, the exhaust ducts.

It is an object of this invention, therefore, to provide an improved means for air-cooling the bearings of dynamoelectric machines by a flow of ambient air which is supplied in intimate contact with the bearing to be cooled at a temperature nearer the atmospheric temperature than heretofore.

With the above and other objects in view, as will hereinafter appear, the invention comprises the devices, combinations, and arrangements of parts hereinafter set forth and illustrated in the accompanying drawings of a preferred embodiment of the invention, from which the several features of the invention and the advantages attained thereby will be readily understood by those skilled in the art.

Figure 1:
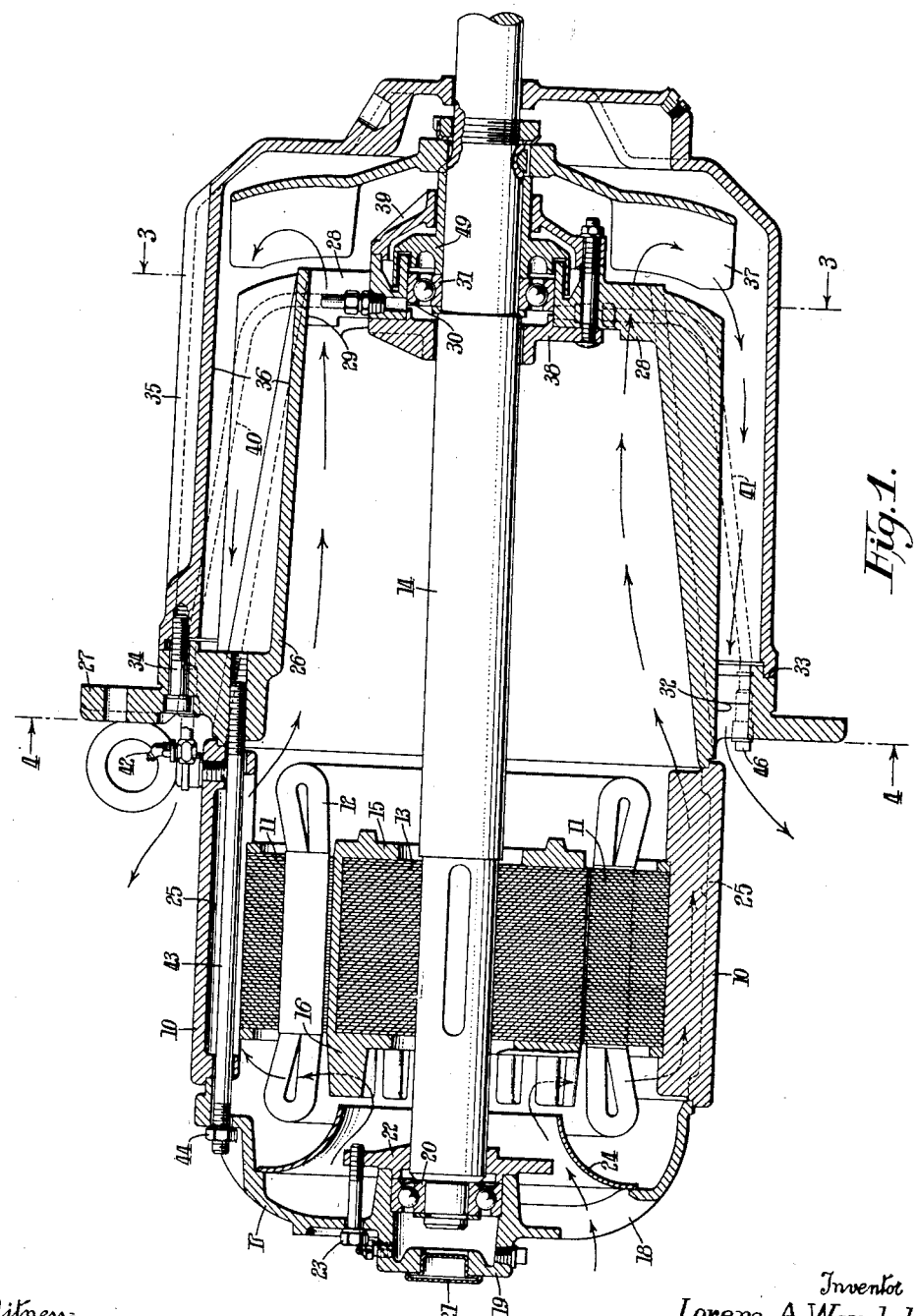
Fig. 1 is a longitudinal section taken through a motor embodying the invention.

Referring now to Fig. 1, there is shown an electric motor comprising an annular stator frame 10 to which is secured a stator core 11 of stacked magnetic laminations carrying a stator winding 12.

A rotor core 13 secured to a shaft 14 carries a die-cast squirrel-cage winding 15 formed integrally with fan blades 16 providing a centrifugal fan for circulating ventilating air as will be explained presently.

An end-cover 17 is formed with radially-disposed apertured portions 18 which serve as ventilating air inlet openings and surround a central hollow boss 19 which provides within itself a seat for the outer race ring of a bearing 20 in which said shaft 14 is journaled. Also within the hollow boss 19 is a portion, adjacent said bearing 20, which serves as a lubricant reservoir which is closed by a cap 21. A bearing-cap 22 secured to the end-bell by stud bolts 23 holds the bearing 20 in its seat.

Within the end-cover 17 and secured thereto adjacent the inlet openings 18, is an annular baffle ring 24 which is generally conical in shape and inwardly constructed so as to guide the incoming air to the inner edges of the fan blades 16, as shown by the arrows in Fig. 1. The frame 10 is formed on its inner periphery with circumferentially-spaced longitudinal grooves 25 which provide vent ducts for circulating ventilating air from one end of the machine to the other and in intimate heat-extracting contact with the stator core 11.

Figure 3:
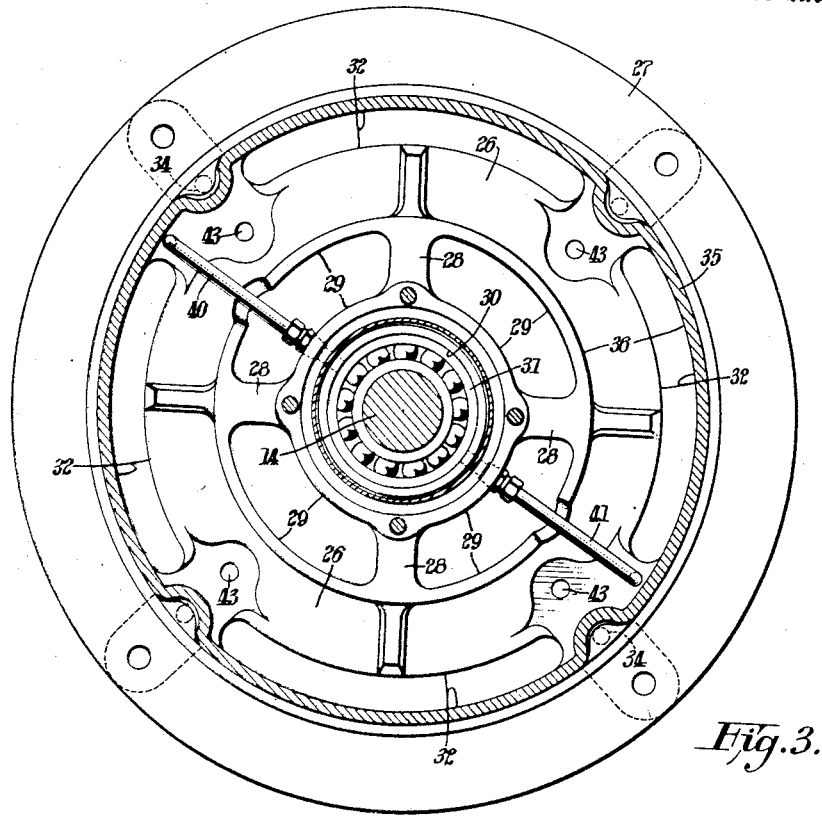
Fig. 3 is an enlarged transverse section taken on line 3—3 of Fig. 1.
Figure 5:
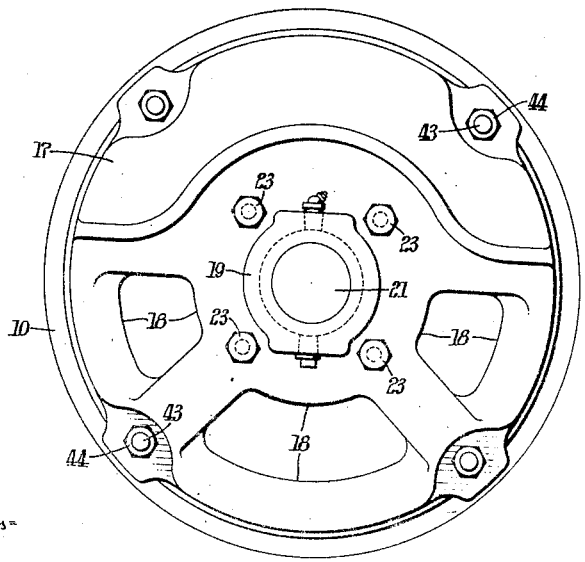
Fig. 5 is an end elevation view of the motor of Fig. 1 taken at the end opposite the shaft-extension end.
Figure 4:
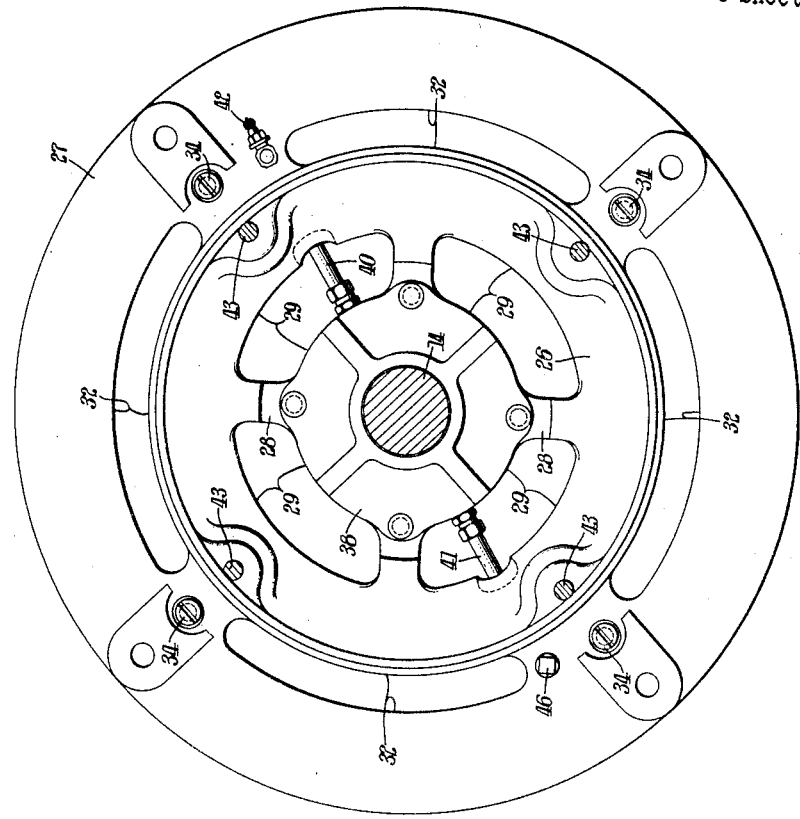
Fig. 4 is an enlarged end elevation view, partly in section, looking into the detached end-cover approximately on the line 4—4 of Fig. 1.

At the driving end of the machine is a second end-cover 26 formed at the end nearest the stator frame with an external flange ring 27 and at the opposite end with a transverse wall 28 having circumferentially spaced air passages 29 and a single central apertured portion 30 in which is seated a ball bearing 31, as seen best in Fig. 3. Also located in the wall at the flange end of the end-cover 26 are circumferentially spaced air passages 32. Surrounding said air passages 32 and secured to said end-cover 26 along a finished annular shoulder 33 by means of tap screws 34 is a cover or shell 35 nested with and spaced from said end-cover 26 to form therewith an annular air space 36 and a space at the end of and exterior to the end-cover 26 to provide a housing for a radial fan 37 secured to the shaft 14 for circulation of ventilating air as indicated by the arrows shown in Fig. 1. The central apertured portion 30 is enclosed at each end by bearing covers 38 and 39, respectively, which form with said apertured portion a grease lubricant reservoir for said bearing, which reservoir is connected with the exterior by means of an inlet or filler pipe 40 and an outlet or drain pipe 41 as seen best in Fig. 4. The inlet pipe 40 terminates in a conventional pressure-type lubrication fitting 42 while the outlet pipe terminates in a removable plug 46. Secured to the shaft 14 is a grease retainer 49 which prevents the adverse travel of grease along the shaft and away from the bearing 31 when the motor is operated in a vertical position.

It will be seen that the through-bolts 43, which pass through the frame 10 and the end-cover 17, are tapped into the end-cover 26 and are provided with nuts 44 for securing the main stator parts in bearing-aligned assembly.

From the above it is evident that ventilating air is drawn in through the inlet openings 18 by the action of the fan blades 16, whence it is forced radially outward to pass longitudinally through the grooves 25, which lie behind the stator core 11, and thence, into the space within the end-cover 26. From here the air is drawn by the fan 37 at considerable velocity through the air passages 29 adjacent the bearing 31, thence radially through the fan and into the annular space 36 whence it discharges to the exterior through the air passages 32. It will be noted that this air is not exposed to the extreme heat of the drying chamber (which would occur in its passage through the space 36) until after it has completed its function of cooling the motor and its associated parts, particularly the bearing 31 which is especially difficult to cool on account of its position well within the oven.

Figure 2:
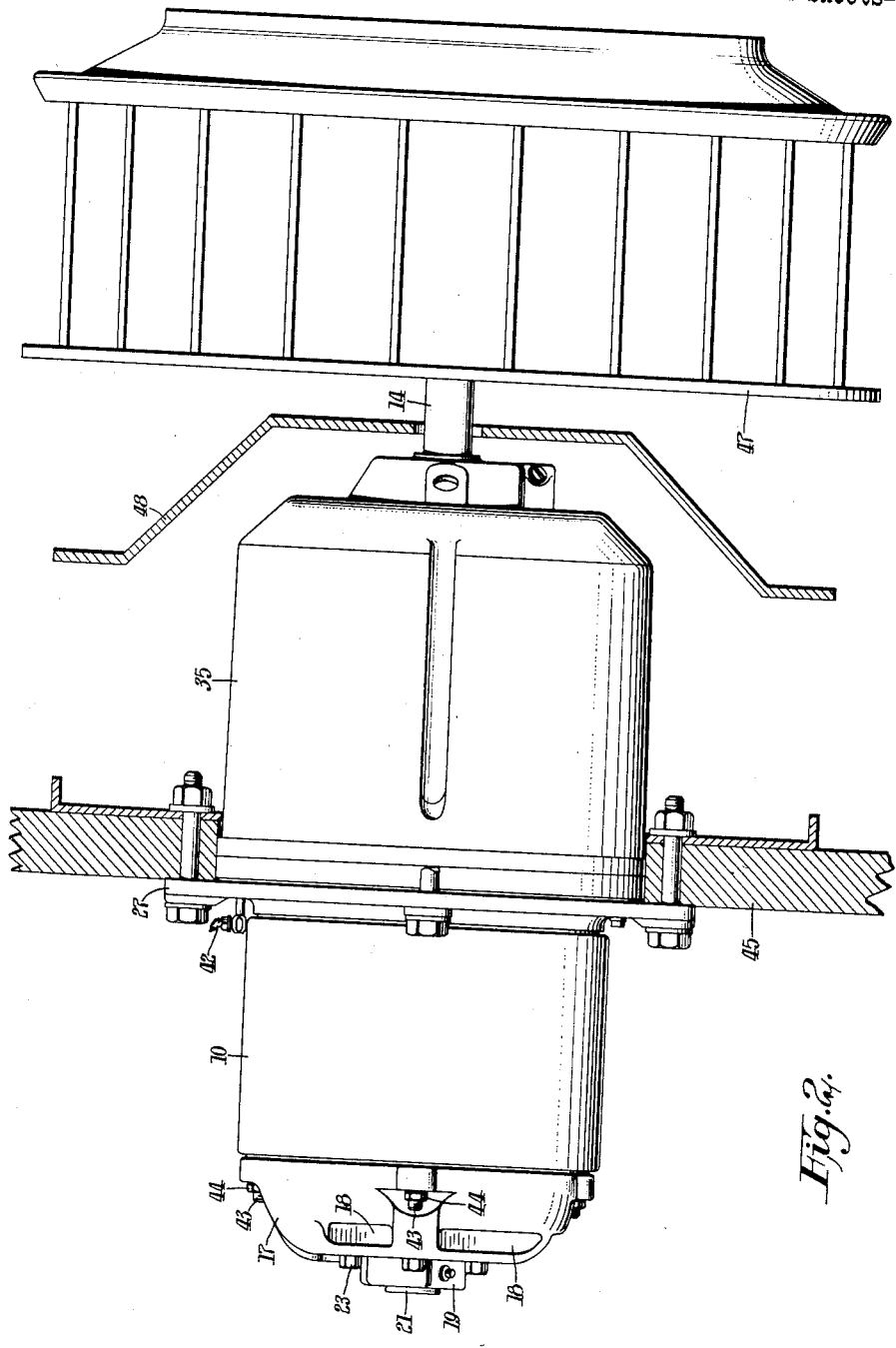
Fig. 2 is a longitudinal elevation, partly in section, showing the motor of Fig. 1 in normal use driving a fan operating inside a drying chamber.

Referring to Fig. 2, there is shown a motor of the type described above, mounted in the wall 45 of a drying chamber or oven and connected to drive an impeller wheel 47 for circulating the hot air within the chamber. A heat shield 48 is employed to partially divert the circulation of hot air in the chamber away from the cover 35, thereby to lighten the burden on the cooling system of the motor itself. It will be appreciated that the ventilating problem is made more severe because a very large portion of the motor is located inside and exposed to the heat of the oven in order to provide bearing support very close to the impeller.

Figure 6:
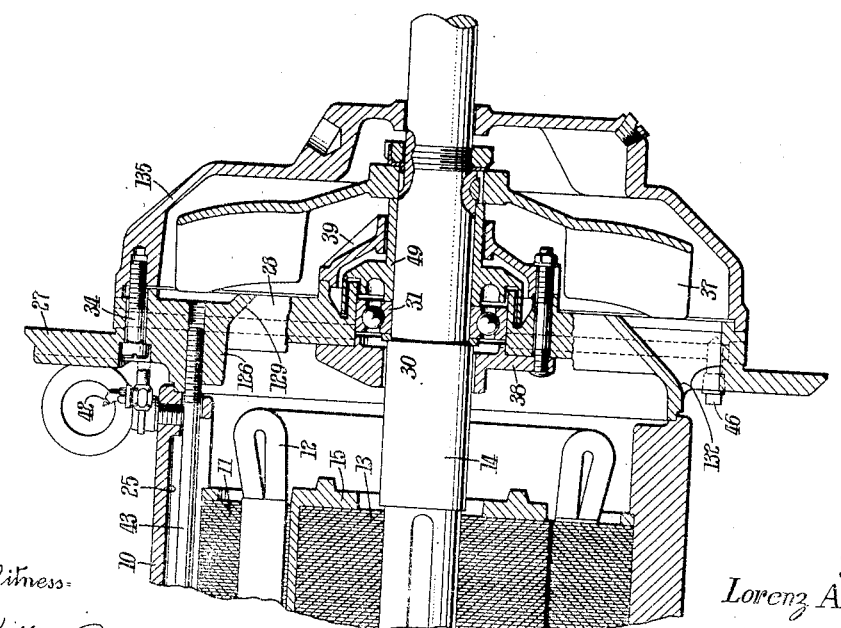
Fig. 6 is a fragmentary longitudinal section taken through a modification of the motor of Fig. 1.

Fig. 6 illustrates a modification of the motor of Fig. 1, in which a much shorter driving-end cover may be used because the impeller is to be operated closer to the oven wall. It will be seen that, except for the size and shape of the covers 126 and 135, and of the air passages 129 and 132, everything is substantially the same as for the longer motor of Fig. 1 and the basic ventilation arrangement has not been changed.

From the above it will be perceived that, according to the invention, there has been provided, in a motor for driving a fan in a high-temperature drying oven, a high-velocity flow of ventilating air past the driving-end bearing, which air is but slightly hotter than the ambient temperature because it is guided in such a path that it does not absorb any significant heat directly from the drying chamber before it performs its function of extracting heat from said bearing.

Having thus set forth the nature of the invention, what I claim herein is:

1. In a dynamoelectric machine of the open-frame type, a stator frame, an elongated end-cover formed at one end with a supporting flange and secured to said stator frame at said flanged end, a shaft, a bearing for said shaft carried by said end-cover at the end opposite said flanged end, ventilating ducts formed in said end-cover radially adjacent said bearing, an imperforate cylindrical shell surrounding said end-cover, secured thereto, and spaced radially therefrom to form an annular enclosure communicating with the interior of said end-cover by means of said ventilating ducts, said end-cover being provided with an apertured portion adjacent said flanged end for providing communication between said annular enclosure and the atmosphere, and a fan mounted for rotation with said shaft and positioned within said enclosure for setting up a ventilating air flow from within said end-cover past said bearing and reversely through said annular space to the atmosphere.

2. In a dynamoelectric machine of the open-frame type, a composite end-cover comprising an inner cylindrical portion formed at one end with a radial flange and at the other end with a bearing support, axially disposed ventilating ducts in said inner portion surrounding said bearing support, an outer cylindrical portion radially spaced from and completely enclosing said inner portion to form therewith a generally annular enclosure accessible from within said inner portion through said ventilating ducts, said outer portion being secured to said inner portion along a circumferential joint adjacent said flange, and ventilating ducts formed in said inner portion adjacent said flange and radially inside the circumference of said joint but radially outside said ventilating ducts surrounding the bearing support to provide communication between said enclosure and the atmosphere.

3. In a dynamoelectric machine of the open-frame type, an end-cover secured thereto, a bearing supported centrally in said end-cover, a shaft journaled in said bearing, a first group of ventilating ducts located in said end-cover adjacent to said bearing and giving access to the interior of said end-cover, an external shell secured to said end-cover along a circumferential line radially outside of said ventilating ducts, said shell forming with said end-cover a fan housing, a centrifugal fan mounted for rotation on said shaft and within said fan housing, and a second group of ventilating ducts located in said end-cover, radially outside said first group of ventilating ducts but radially within said circumferential line, whereby the draft induced by said fan causes air to flow into said fan housing through said first group of ducts and out of said housing through said second group of ducts.

4. In a dynamoelectric machine of the open-frame type, a first end-cover having air-inlet openings, a rotor, a fan formed on said rotor at the end thereof adjacent said first end-cover, a stator frame, a stator core secured within said frame, longitudinal ventilating ducts formed in said frame behind said core, a second end-cover of generally cylindrical shape forming with said dynamoelectric machine an enclosure communicating with said ventilating ducts and provided with an external flange portion at the end adjacent said dynamoelectric machine and with a transverse wall portion at the opposite end thereof, a bearing centrally disposed in said wall portion, air passages therein surrounding said bearing and communicating with the interior of said second end-cover, a rotor shaft journaled in said bearing, a centrifugal fan secured to said shaft adjacent to and externally of said second end-cover, a casing for said fan, secured to said second end-cover by a circumferential joint in said flange portion, and air-outlet passages in said flange portion disposed radially within said circumferential joint.

References Cited in the file of this patent

UNITED STATES PATENTS

| Number | Name | Date |
|--------|------|------|
| 1,697,279 | Klemm | Jan. 1, 1929 |
| 2,196,952 | Bogaty | Apr. 9, 1940 |

FOREIGN PATENTS

| Number | Country | Date |
|--------|---------|------|
| 116,592 | Australia | Feb. 16, 1943 |